(12) United States Patent
Hladik, Jr.

(10) Patent No.: US 8,463,299 B1
(45) Date of Patent: Jun. 11, 2013

(54) DISPLAYING A DIGITAL VERSION OF A PAPER MAP AND A LOCATION OF A MOBILE DEVICE ON THE DIGITAL VERSION OF THE MAP

(75) Inventor: William J. Hladik, Jr., Harrisburg, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/492,111

(22) Filed: Jun. 8, 2012

(51) Int. Cl.
*H04W 24/00* (2009.01)

(52) U.S. Cl.
USPC .................. 455/457; 455/456.1; 345/660

(58) Field of Classification Search
USPC .............. 455/456.1, 575.1, 457, 456.3, 66.1, 455/550.1, 422.1, 557; 345/158, 168, 660; 361/679.3; 702/51; 703/8; 715/830; 705/337
See application file for complete search history.

(56) References Cited

U.S. PATENT DOCUMENTS

| 5,528,248 | A | * | 6/1996 | Steiner et al. ............ 342/357.31 |
| 5,819,199 | A | | 10/1998 | Kawai et al. |
| 6,088,648 | A | | 7/2000 | Shah et al. |
| 6,983,155 | B1 | * | 1/2006 | Cook ......................... 455/456.1 |
| 7,312,803 | B2 | | 12/2007 | Wilkins |
| 7,565,155 | B2 | * | 7/2009 | Sheha et al. ............... 455/456.1 |
| 7,788,816 | B2 | | 9/2010 | Hembree |
| 2003/0078725 | A1 | | 4/2003 | Koyama |
| 2007/0065042 | A1 | | 3/2007 | Vroomen |
| 2007/0171716 | A1 | * | 7/2007 | Wright et al. ............ 365/185.12 |
| 2008/0071749 | A1 | * | 3/2008 | Schloter ............................. 707/3 |
| 2008/0071770 | A1 | * | 3/2008 | Schloter et al. .................... 707/5 |
| 2008/0167106 | A1 | * | 7/2008 | Lutnick et al. .................. 463/16 |
| 2010/0010738 | A1 | | 1/2010 | Cho |
| 2010/0171763 | A1 | * | 7/2010 | Bhatt et al. ..................... 345/660 |
| 2011/0010241 | A1 | * | 1/2011 | Mays ......................... 705/14.49 |
| 2011/0169946 | A1 | | 7/2011 | Rudin et al. |
| 2011/0282570 | A1 | * | 11/2011 | Tanioka et al. ............... 701/200 |

FOREIGN PATENT DOCUMENTS

| JP | 10213445 A | 8/1998 |
| JP | 2007264268 A | 10/2007 |

OTHER PUBLICATIONS

Chinthammit et al., "MagicMap—Hit Lab Australia" Human Interface Technology Laboratory Australia, 2012 [online], [retrieved on Apr. 5, 2012]. Retrieved from the Internet <URL: http://www.hitlab.utas.edu.au/wiki/MagicMap>.

Imaging Control, "IC Imaging Control C++: Creating an Overlay | Technical Documentation | Image Acquisition Components" imagingcontrol.com [online], [retrieved on Apr. 5, 2012]. Retrieved from the Internet <URL: http://www.imagingcontrol.com/en_US/support/documentation/class/Overlay.htm>.

(Continued)

*Primary Examiner* — Mahendra Patel
(74) *Attorney, Agent, or Firm* — Maeve L. McCarthy; Arthur J. Samodovitz

(57) ABSTRACT

A tool for displaying a current location of a mobile computing device on a map displayed on the mobile computing device, the mobile computing device containing a GPS unit. A mobile computing device scans a bar code printed on an external paper map. The mobile computing device then sends a request to a server for a digital version of the map that corresponds to the bar code. Then, the mobile computing device receives the digital version of the map and calculates the current location of the mobile computing device, as determined from the GPS unit. The mobile computing device then displays the digital version of the map and the current location of the mobile computing device on the displayed map.

7 Claims, 8 Drawing Sheets

OTHER PUBLICATIONS

Livestream, "Use motion graphics—Livestream >> User Guide" livestream.com [online], [retrieved on Apr. 5, 2012]. Retrieved from the Internet <URL: http://www.livestream.com/userguide/index.php?title=Use_motion_graphics>.

Pedrotti, "Basic Geometrical Optics" Fundamentals of Photonics Module 1.3, spie.org [online], [retrieved on Apr. 5, 2012]. Retrieved from the Internet <URL: http://spie.org/Documents/Publications/00%20STEP%20Module%2003.pdf>.

Reilly et al., "Mobile Lenses: a Hybrid Approach to Direct Interaction with Maps and Kiosks" Dalhousie University, Faculty of Computer Science, 2006 [online], [retrieved on Jan. 28, 2012]. Retrieved from the Internet <URL: http://citeseerxist.psu.edu/viewdoc/download?doi=10.1.1.87.333&rep=rep1&type=pdf>.

Teacherschoice.com, "Triangle given 3 points" teacherschoice.com [online], [retrieved on Apr. 5, 2012]. Retrieved from the Internet <URL: http://www.teacherschoice.com.au/maths_library/trigonometry/triangle_given_3_points.htm>.

Wikipedia, "Character Generator", Published on: Sep. 9, 2011, Wikipedia, the free encyclopedia [online], [retrieved on Apr. 5, 2012]. Retrieved from the Internet <URL: http://en.wikipedia.org/w/index.php?title=Character_generator&oldid=449414594>.

Wikipedia, "Euclidean Geometry", Published on: Nov. 5, 2011, Wikipedia, the free encyclopedia [online], [retrieved on Apr. 5, 2012]. Retrieved from the Internet <URL: http://en.wikipedia.org/w/index.php?title=Euclidean_geometry&oldid=459075148>.

Wikipedia, "Triangulation", Published on: Nov. 3, 2011, Wikipedia, the free encyclopedia [online], [retrieved on Apr. 5, 2012]. Retrieved from the Internet <URL: http://en.wikipedia.org/w/index.php?title=Triangulation&oldid=458828792>.

Wikipedia, "Trigonometry", Published on: Nov. 5, 2011, Wikipedia, the free encyclopedia [online], [retrieved on Apr. 5, 2012]. Retrieved from the Internet <URL: http://en.wikipedia.org/w/index.php?title=Trigonometry&oldid=459072920>.

Wikipedia, "Trilateration", Published on: Oct. 23, 2011, Wikipedia, the free encyclopedia [online], [retrieved on Apr. 5, 2012]. Retrieved from the Internet <URL: http://en.wikipedia.org/w/index.php?title=Trilateration&oldid=457048061>.

YouTube, "Computer Controlled Laser Pointer—YouTube", Uploaded by Elspin on: Feb. 28, 2010, YouTube LLC [online], [retrieved on Apr. 16, 2012]. Retrieved from the Internet <URL: http://www.youtube.com/watch?v=M18g5i6CKjU>.

YouTube, "Partometer—camera measure—YouTube", Uploaded by vistechprojects on: Sep. 3, 2011, YouTube LLC [online], [retrieved on Apr. 16, 2012]. Retrieved from the Internet <URL: http://www.youtube.com/watch?v=OJO5zG-IJuA>.

YouTube, "Telemeter—camera measure—YouTube", Uploaded by vistechprojects on: Sep. 23, 2011, YouTube LLC [online], [retrieved on Apr. 16, 2012]. Retrieved from the Internet <URL: http://www.youtube.com/watch?v=Q-bJW0anq2o>.

* cited by examiner ial version of a paper map and a location of a mobile device on
the digital version of the map.

DISPLAYING A DIGITAL VERSION OF A PAPER MAP AND A LOCATION OF A MOBILE DEVICE ON THE DIGITAL VERSION OF THE MAP

FIELD OF THE INVENTION

The present invention relates generally to mobile device technology, and more particularly relates to displaying a digital version of a paper map and a location of a mobile device on the digital version of the map.

BACKGROUND

Existing mobile devices (e.g., cellular phones, smart phones, personal digital assistants, etc.) include navigation systems that allow the mobile device to be used as a navigation device. The navigation systems receive positioning signals from Global Positioning System (GPS) satellites and use the GPS information in conjunction with existing mapping software and services and stored maps to locate the mobile navigation device on an image of a map. For example, a known Garmin™ navigation device contains a multitude of maps stored on nonvolatile storage. The Garmin™ navigation device tracks the current location of the device and displays this location on one of the stored maps. The Garmin™ navigation device also displays the compass direction of the map as well as latitude and longitude coordinates for the maps.

Web-based navigation systems, such as Google Maps™ system and MapQuest™ system, are also known where the maps are stored in and accessed from a web server. When a mobile device accesses a web-based navigation system, the mobile device sends to the web server the current GPS location of the mobile device and receives from the web server, a map encompassing the current GPS location of the mobile device. The mobile device then displays the retrieved map on a screen along with the location of the mobile device as a point on the map and compass directions for the map orientation.

US Publication 2011/0282570 by Tanioka discloses a mobile device which extracts information, such as street names, addresses and destinations, from a map image and an address image, and uses the information to plot a route to the destination location. US2011/0282570 by Tanioka communicates the extracted information, information regarding an approximate geographic location of the mobile device, and/or information regarding a desired starting geographic location for routing other than the mobile device's present location to a mapping service server. In response, the mapping service server communicates to the mobile device an image of a map as well as routing information for navigating to the destination. The routing information is overlaid and displayed on the map image and the routing information may include one or more graphical elements, such as a present location, a starting location, a destination location, a route to be taken, a geographical orientation and a geographical landmark obtained from either a GPS system, user provided data or a mapping service server.

US Publication 2003/0078725 by Koyama displays a present position obtained by a positioning system, for example, a GPS system, on a map of a vicinity of the present position. US 2003/0078725 by Koyama uses a device with a line sensor or other input means for reading a map. The device reads a map of the vicinity of the present position, converts the map into bitmapped data and stores the data in a memory for subsequent display.

US 2003/0078725 by Koyama also carries out input operations of two user-defined reference points when the read map is displayed. A user defines a point that is a distinct position on the map, and in response, the device determines the point's GPS absolute coordinates and stores them in the memory. The process is repeated for a second user-defined point that is a distinct position on the map. The device then calculates its present position on the map based on triangle relationships among positions of three points, using the absolute coordinates positions of the two reference point positions and the absolute coordinates position of the present position obtained by the GPS receiver positioning system. The calculated present position on the map is represented by a mark on the map displayed.

SUMMARY

Aspects of an embodiment of the present invention disclose a method and computer system to display a map on a mobile computing device and a location of the mobile computing device on the map, the mobile computing device containing a GPS unit. The method comprises a mobile computing device scanning a bar code printed on a paper map external to the mobile computing device, the bar code identifying the paper map. The method further comprises the mobile computing device sending a request to a server, via a network, for a digital version of the map that corresponds to the bar code. The method further comprises the mobile computing device receiving the digital version of the map from the server, calculating a current location of the mobile computing device as determined from the GPS unit, and displaying the digital version of the map and the current location of the mobile computing device on the displayed map.

In another embodiment, the present invention discloses a computer program product to display a map on a mobile computing device and a location of the mobile computing device on the map, the mobile computing device containing a GPS unit. The computer program product comprises program instructions to scan an image of a paper map external to the mobile computing device and to scan a bar code printed on the paper map, the bar code identifying a geographic region encompassed by the paper map. The computer program product further comprises program instructions to calculate, based in part on the geographic region encompassed by the paper map and a current location of the mobile computing device as determined from the GPS unit, a current location of the mobile computing device on the paper map. The computer program product further comprises program instructions to display the image of the paper map and the current location of the mobile computing device on the map.

DETAILED DESCRIPTION

Figure 1:
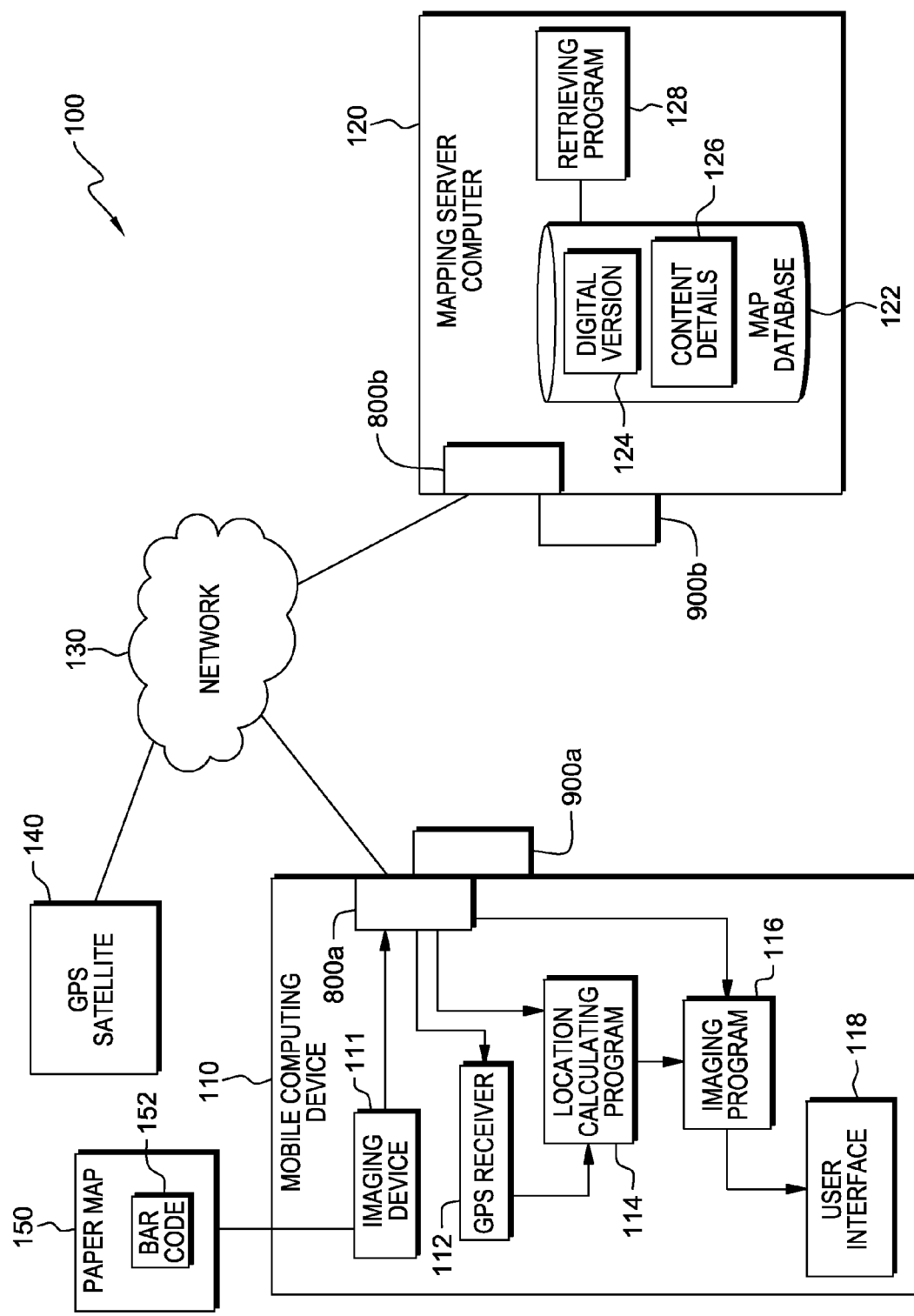
FIG. 1 is a functional block diagram of a distributed data processing environment, including a mobile computing device and a mapping server computer, in accordance with an embodiment of the present invention.

FIG. 1 is a functional block diagram illustrating a distributed data processing environment, generally designated 100, in accordance with one embodiment of the present invention. Distributed data processing environment 100 includes mobile computing device 110, mapping server computer 120, and GPS satellite 140, all interconnected over network 130. Also shown are paper map 150 with a bar code 152, which provide information to mobile computing device 110.

Network 130 can be, for example, a local area network (LAN), a wide area network (WAN) such as the Internet, or a combination of the two, and can include wired, wireless, or fiber optic connections. In general, network 130 can be any combination of connections and protocols that will support communications between mobile computing device 110, mapping server computer 120 and GPS satellite 140.

In various embodiments of the present invention, mobile computing device 110 can be a laptop computer, tablet computer, netbook computer, personal computer (PC), a personal digital assistant (PDA), a smart phone, or any programmable electronic device capable of communicating with mapping server computer 120 and GPS satellite 140 via network 130. Mobile computing device 110 may include internal components 800a and external components 900a, as depicted and described in further detail with respect to FIG. 8. Mobile computing device 110 includes imaging device 111, GPS receiver 112, location calculating program 114, imaging program 116 and user interface (UI) 118.

Imaging device 111 can be either internal or external hardware and can be a camera, a scanner, or any other device that can capture or scan a picture or image. In a preferred embodiment of the present invention, GPS receiver 112 receives Global Positioning System (GPS) positioning data from GPS satellite 140, through network 130. In an alternate embodiment, GPS receiver 112 receives GPS positioning data from a user inputting known coordinate information.

Location calculating program 114 resides on mobile computing device 110 and operates to calculate the current location of mobile computing device 110 based on, for example, information received through GPS receiver 112 and geographic location data received from mapping server computer 120. In the preferred embodiment, imaging device 111 is a camera, which is used to take a photograph of a bar code 152 included on a paper map 150. The term "paper" includes wood pulp based paper as well as plastic sheets or other synthetic sheets on which a map can be printed with ink or the like, as well as other hard surfaces (such as a wall of a kiosk) on which a map can be printed. Bar code 152 uniquely identifies the paper map. Mobile computing device 110 sends bar code 152 to mapping server computer 120, via network 130. Mapping server computer 120 uses information contained in bar code 152 to identify the map from a pool of maps stored at the server. In one embodiment, a map database 122, which contains numerous digital versions of maps and their content details, indexed by bar code, may be located on mapping server computer 120. In an alternative embodiment, map database 122 may be located on an external drive of mapping server computer 120 or associated network storage. Mapping server computer 120 then downloads to mobile computing device 110 a digital copy, from storage, of paper map 150, along with the content details of the map, based on bar code 152.

Imaging program 116 on mobile computing device 110 displays the digital version of paper map 150 that was received via network 130 from mapping server computer 120. After calculating the current location of mobile computing device 110, location calculating program 114 notifies imaging program 116 of this location, which then displays the current location of mobile computing device 110 with a graphical element, such as a dot, on the corresponding digital version of the map on UI 118. This will help a user of mobile computing device 110 locate himself or herself on the map and in the region encompassed by the map. UI 118 may be a graphical user interface (GUI) or a web user interface (WUI) and also displays text, graphics and user options pertaining to the displayed maps.

Figure 9:
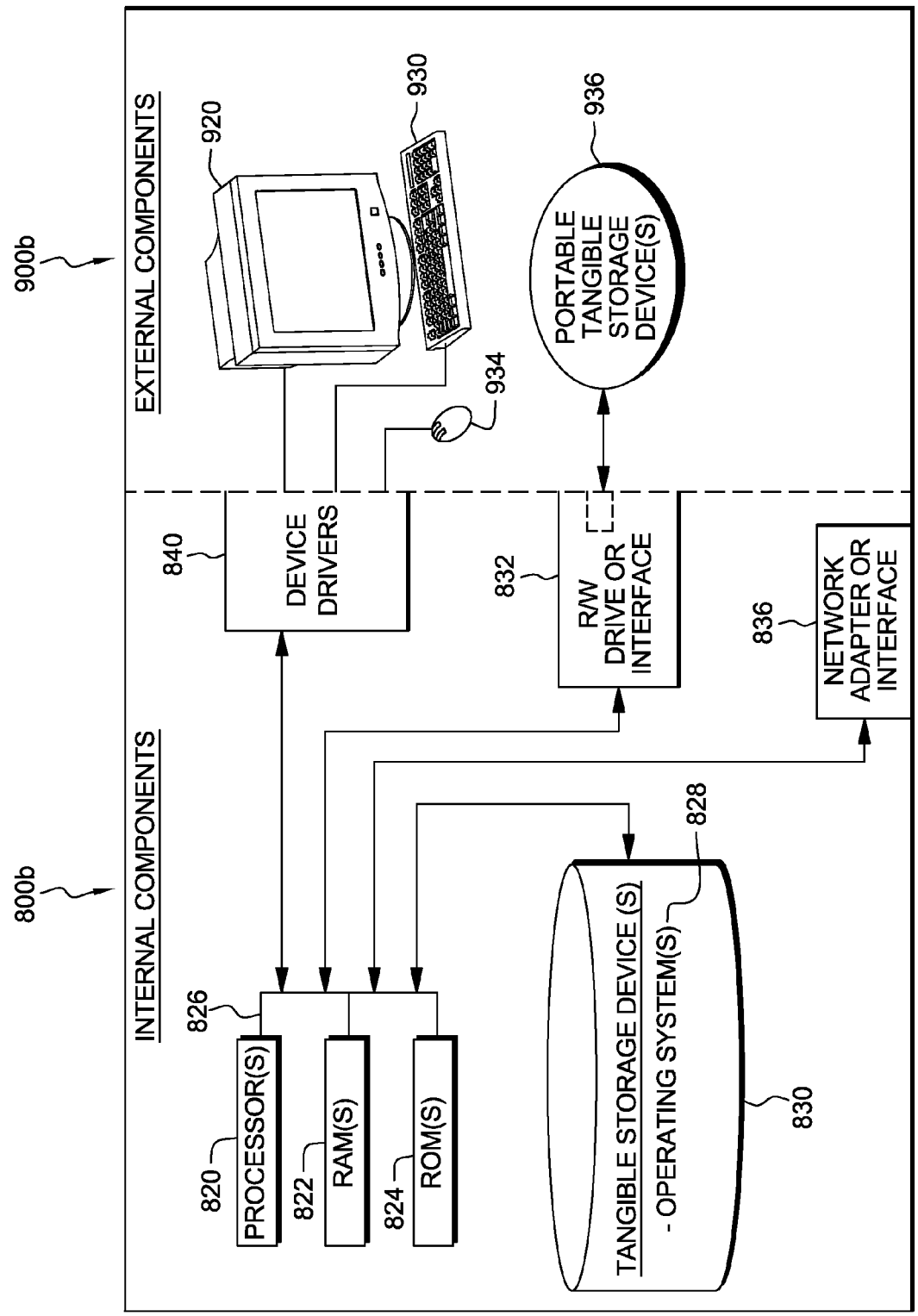
FIG. 9 is block diagram of internal and external components of a data processing system, such as the mapping server computer of FIG. 1, in accordance with an embodiment of the present invention.

Mapping server computer 120 may contain internal components 800b and external components 900b, as depicted and described in further detail with respect to FIG. 9. Mapping server computer 120 includes map database 122 and retrieving program 128. Map database 122 contains both digital version 124 and content details 126. Digital version 124 stores digital versions of paper maps, indexed by bar code. Content details 126 include a description of the geographic region encompassed by the map (used to position mobile computing device 110 on the map digital version), compass reference points to orient the map in the display screen, and metadata such as a descriptive name of the map (for example, London city map) and information about attractions illustrated on the map. The user can access the metadata from icons on the map image. Also stored with content details 126 is geographic location data, such as GPS coordinate information and distance measurement data, for at least two predetermined reference points located on a corresponding digital version of the map. Retrieving program 128, on mapping server computer 120, retrieves information from map database 122 when mobile computing device 110 sends bar code 152 to mapping server computer 120, via network 130.

Figure 2:
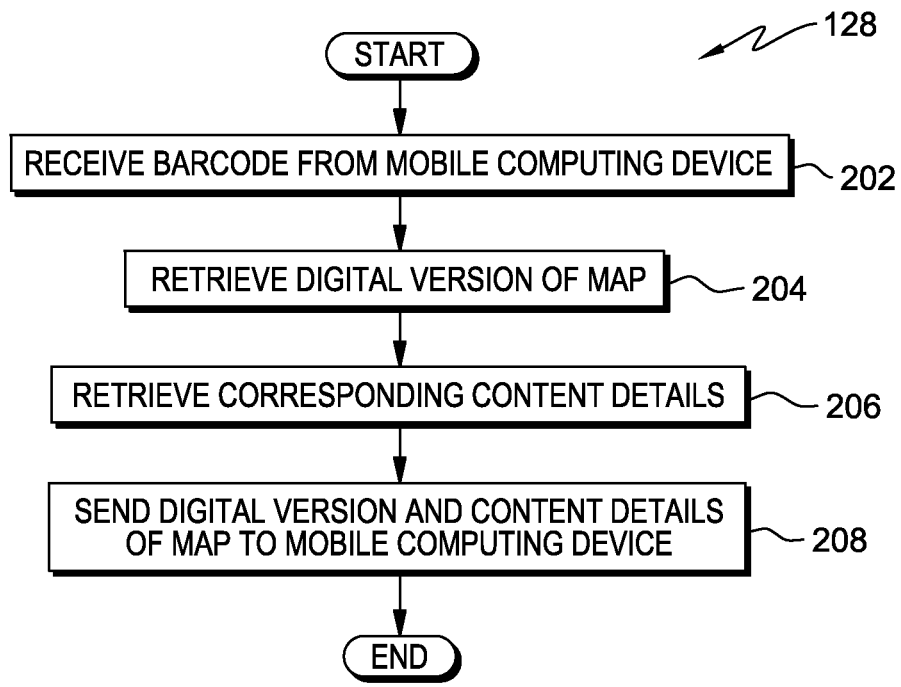
FIG. 2 is a flowchart illustrating the steps of a retrieving program, residing on the mapping server computer of FIG. 1, for retrieving digital versions and content details from a map database, in accordance with an embodiment of the present invention.

FIG. 2 is a flowchart illustrating steps performed by retrieving program 128 to retrieve digital versions 124 and content details 126 from map database 122, in accordance with an embodiment of the present invention.

Retrieving program 128 operates when mobile computing device 110 sends a bar code 152 via network 130 (step 202). Retrieving program 128 uses information contained in bar code 152 to retrieve a corresponding digital version 124 of paper map 150, which is stored in map database 122 (step 204). Retrieving program 128 also accesses content details 126 in map database 122 and retrieves, based on bar code 152 information, geographic region information and geographic location data for associated paper map 150 (step 206). In the preferred embodiment, geographic location data, including GPS coordinate information, is stored in map database 122 for at least two pre-determined reference points on each map. Geographic location data may also include distance measurement data between the two pre-determined reference points. The distance measurement is not the real world distance between the two points, but the actual distance between the points on paper map 150. The distance information is used by location calculating program 114 when calculating the current location of mobile computing device 110. Finally, retrieving program 128 sends the corresponding digital version and content details of the map for received bar code 152 from map database 122 to mobile computing device 110, via network 130 (step 208). In one embodiment, the corresponding digital version and content details of the map may be stored on mobile computing device 110 for continued use.

Figure 3:
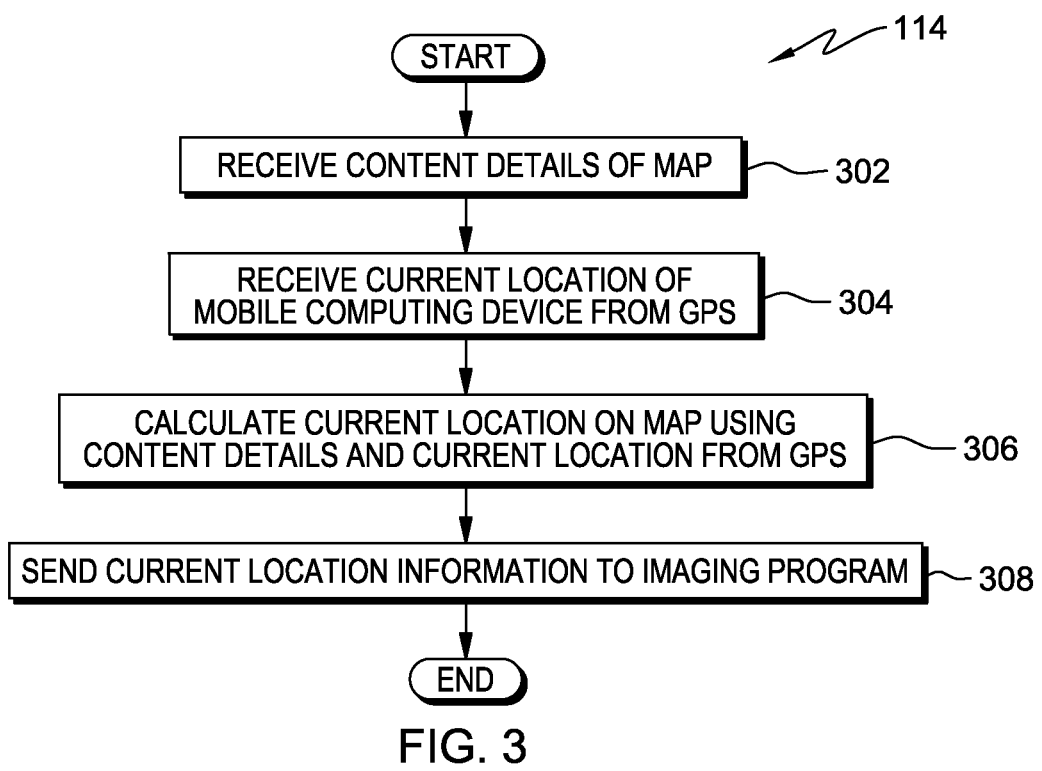
FIG. 3 is a flowchart illustrating the steps of a location calculating program, residing on the mobile computing device of FIG. 1, for calculating a current location of the mobile computing device, in accordance with an embodiment of the present invention.

FIG. 3 is a flowchart illustrating the steps performed by location calculating program 114 to calculate a current location of mobile computing device 110 on a map, in accordance with an embodiment of the present invention.

In the preferred embodiment, a user of mobile computing device 110 captures a photograph with imaging device 111 of a bar code 152 on a paper map 150 or reads the bar code directly. Mobile computing device 110 sends the captured image or bar code information to mapping server computer 120. In response, retrieving program 128 sends a digital version of the map corresponding to bar code 152 from mapping server computer 120 to mobile computing device 110, along with content details of the digital map, which indicate the geographic region encompassed by the map and geographic location data for points on the map.

Location calculating program 114 receives content details 126 corresponding to paper map 150, including geographic location data for at least two reference points (step 302). The content details for the map may include both GPS coordinate information for the two reference points and distance measurement data between the two reference points on the paper map to aid with calculations. Location calculating program 114 also receives GPS coordinate information for the current location of mobile computing device 110 through GPS receiver 112, located on mobile computing device 110 (step 304).

Using both content details 126 and GPS coordinate information for the current location, location calculating program 114 calculates the current location of mobile computing device 110 on the map in relation to the reference points (step 306). These calculations may include, for example, trilateration, triangulation, trigonometry, or Euclidean geometry. Location calculating program 114 next forwards the calculated current location of mobile computing device 110 on paper map 150 to imaging program 116 (step 308).

Figure 4:
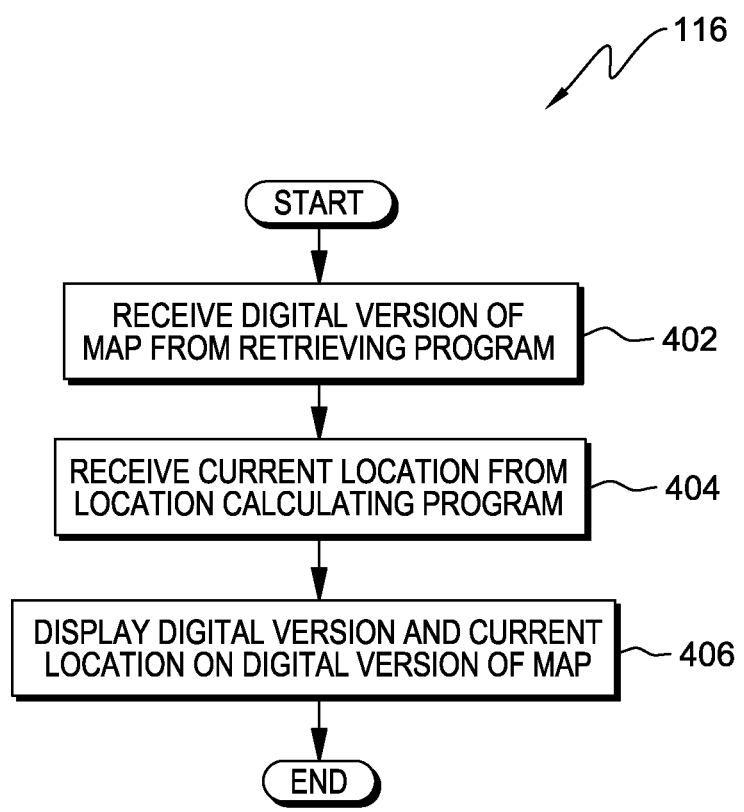
FIG. 4 is a flowchart illustrating the steps of an imaging program, residing on the mobile computing device of FIG. 1, for displaying a digital version of a map and the current location of the mobile computing device on the map, in accordance with an embodiment of the present invention.

FIG. 4 is a flowchart of steps performed by imaging program 116 for displaying a digital version of a map and a current location of mobile computing device 110 on the digital version, in accordance with an embodiment of the present invention.

Imaging program 116 receives a digital version of a map that was retrieved by retrieving program 128 and corresponds to bar code 152 sent to mapping server computer 120 by imaging device 111 (step 402). Imaging program 116 also receives the calculated current location of mobile computing device 110 that was determined by location calculating program 114 (step 404). Imaging program 116 then displays, concurrently, the received digital version of the map and the calculated current location on UI 118 (step 406). In some embodiments, the calculated current location can be displayed through the use of a graphical element superimposed on the digital version of the map. A graphical element, for example, may be a star, a circle, or the words "you are here" printed next to an arrow pointing to the calculated current location.

Figure 5:
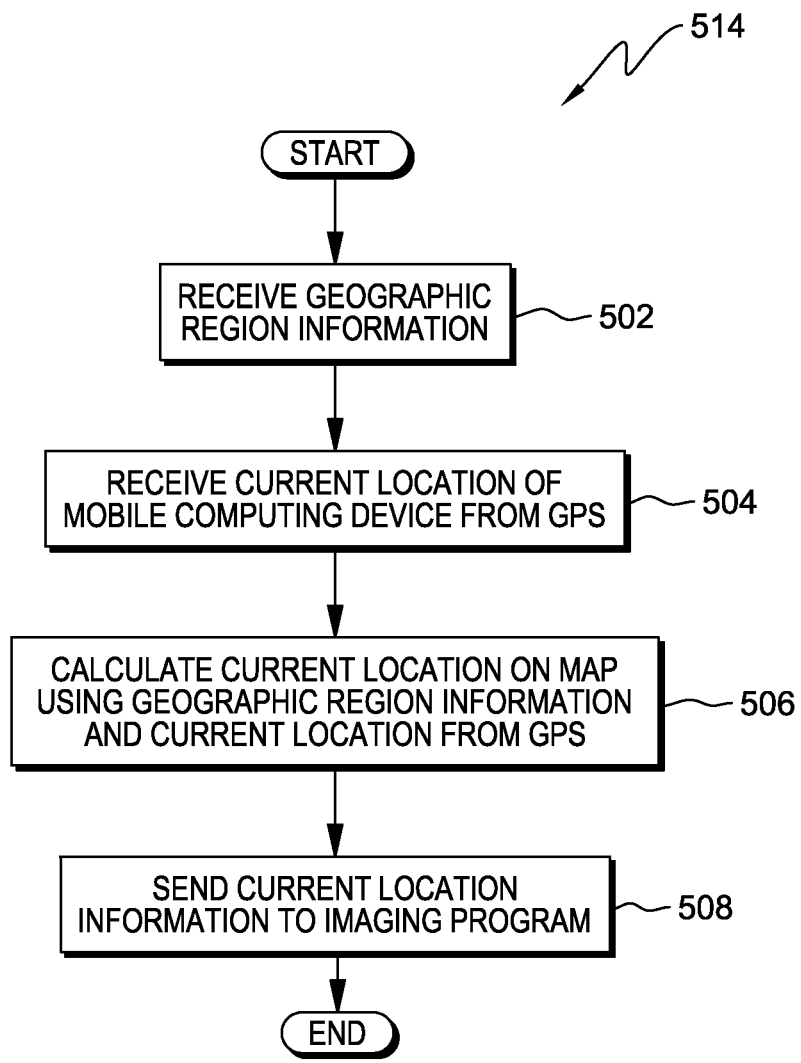
FIG. 5 is a flowchart illustrating steps of the location calculating program of FIG. 3 in accordance with an alternate embodiment of the present invention.

FIG. 5 is a flowchart illustrating steps of location calculating program 514 in accordance with an alternate embodiment of the present invention.

In an alternate embodiment of the present invention, distributed data processing environment 100 includes mobile computing device 110 and GPS satellite 140, which are interconnected over network 130. Paper map 150, with a bar code 152, provides information to mobile computing device 110. In the alternate embodiment, mobile computing device 110 includes imaging device 111, GPS receiver 112, location calculating program 514, imaging program 516 and UI 118. Mobile computing device 110 does not communicate with a mapping server in the alternate embodiment.

In the alternate embodiment, a user of mobile computing device 110 captures, with imaging device 111, a photograph of bar code 152, paper map 150 and one or more compass directions that are printed on the map to indicate the orientation of the map. Mobile computing device 110 then displays the captured image on UI 118, oriented in the proper compass direction with north being upward.

In the alternate embodiment, location calculating program 514 receives geographic region information from the bar code (step 502). Geographic region information contained in bar code 152 indicates the geographic region encompassed by the map, for example, the geographic locations of the four corners of the map or the geographic location of the center point of the map and the north, south, east and west extent (in distance) of the map from the center point. Location calculating program 514 also receives GPS coordinate information for the current location of mobile computing device 110 through GPS receiver 112 located on mobile computing device 110 (step 504).

Using both the geographic region information and GPS coordinate information for the current location, location calculating program 514 calculates the current location of mobile computing device 110 on the map (step 506). These calculations may include, for example, trilateration, triangulation, trigonometry, or Euclidean geometry. Location calculating program 514 next forwards the calculated current location of mobile computing device 110 on paper map 150 to imaging program 516 (step 508).

Figure 6:
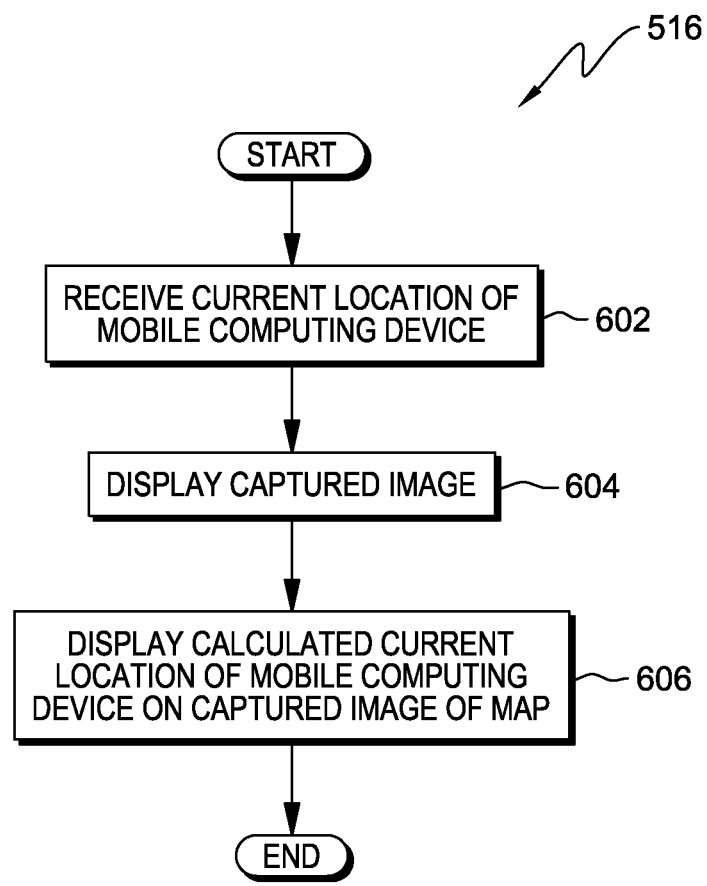
FIG. 6 is a flowchart illustrating steps of the imaging program of FIG. 4 in accordance with an alternate embodiment of the present invention.

FIG. 6 is a flowchart illustrating steps of imaging program 516 in accordance with an alternate embodiment of the present invention.

In the alternate embodiment, imaging program 516 receives the current location of mobile computing device 110 from location calculating program 514 (step 602). Imaging program 516 next displays the image of the paper map captured by imaging device 111 (step 604). Imaging program 516 then displays the calculated current location of mobile computing device 110 on the captured image of the map (step 606). The calculated current location may be displayed using a graphical element, such as a star or a circle, superimposed on the image of the map.

In the alternate embodiment, mobile computing device 110 does not communicate with mapping server computer 120 to receive a digital version of the map, either because a corresponding map is not stored on the server or the user does not have access to the server. Rather, mobile computing device 110, with GPS receiver 112 and location calculating program 514, properly orients the captured map image on the display screen, and indicates the current location of mobile computing device 110 on the actual map image.

Figure 7:
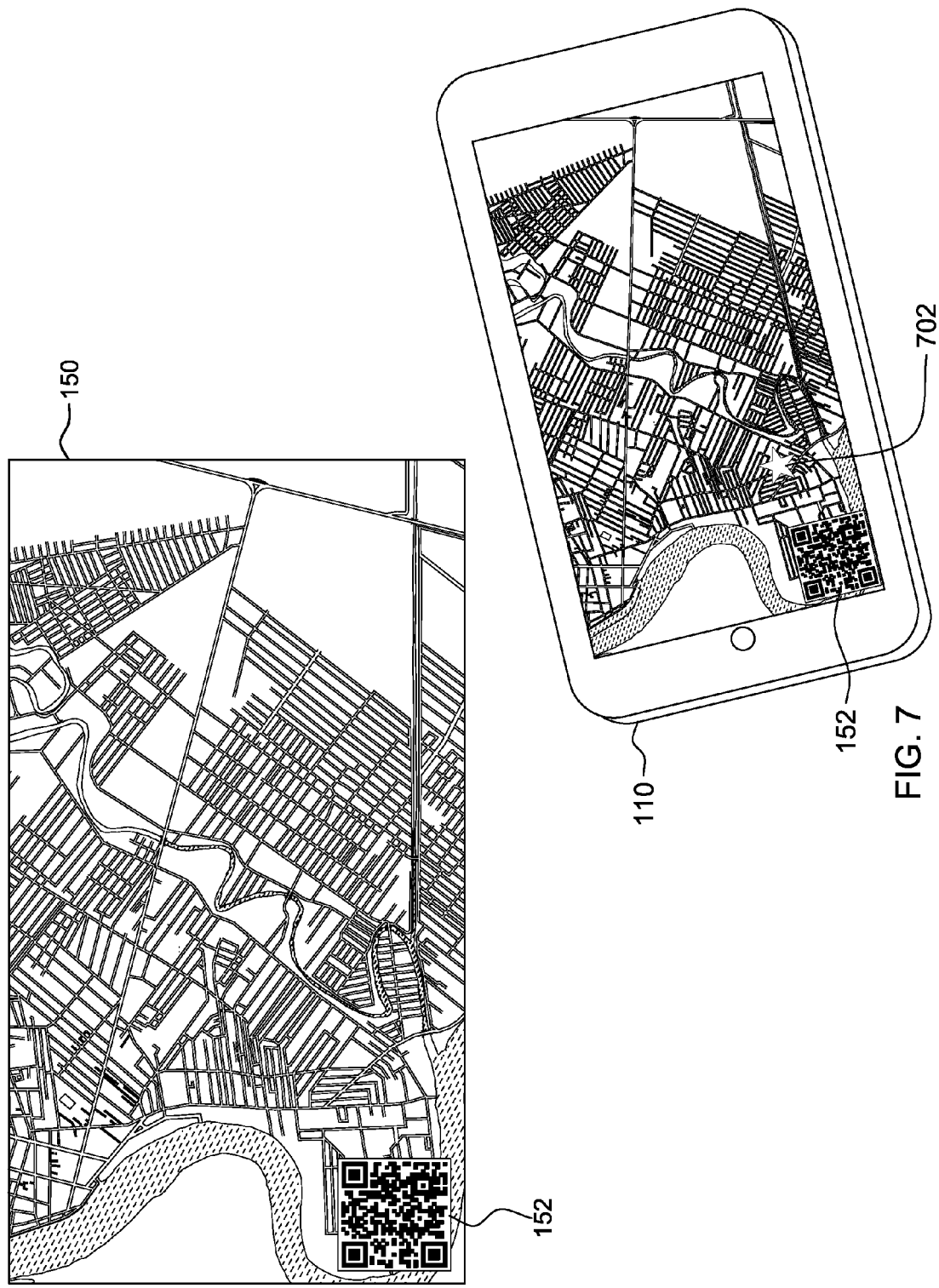
FIG. 7 is an exemplary graphical interface depicting a current location calculated using a location calculating program and displayed using an imaging program on a mobile computing device, in accordance with embodiments of the present invention.

FIG. 7 is one embodiment of an exemplary graphical interface of mobile computing device 110 depicting a current location shown on paper map 150 calculated using location calculating program 114 and displayed on a digital version of a map using imaging program 116, or calculated using location calculating program 514 and displayed on a captured image of a map using imaging program 516, in accordance with embodiments of the present invention.

In the preferred embodiment, a user of a mobile computing device, for example, a smart phone, captures a photograph of bar code 152 and paper map 150. In another embodiment, a user may scan only bar code 152 with the mobile computing device. The calculated current location 702 is then displayed, for example, using a graphical element, on the digital version of paper map 150 on the user's mobile computing device 110.

Figure 8:
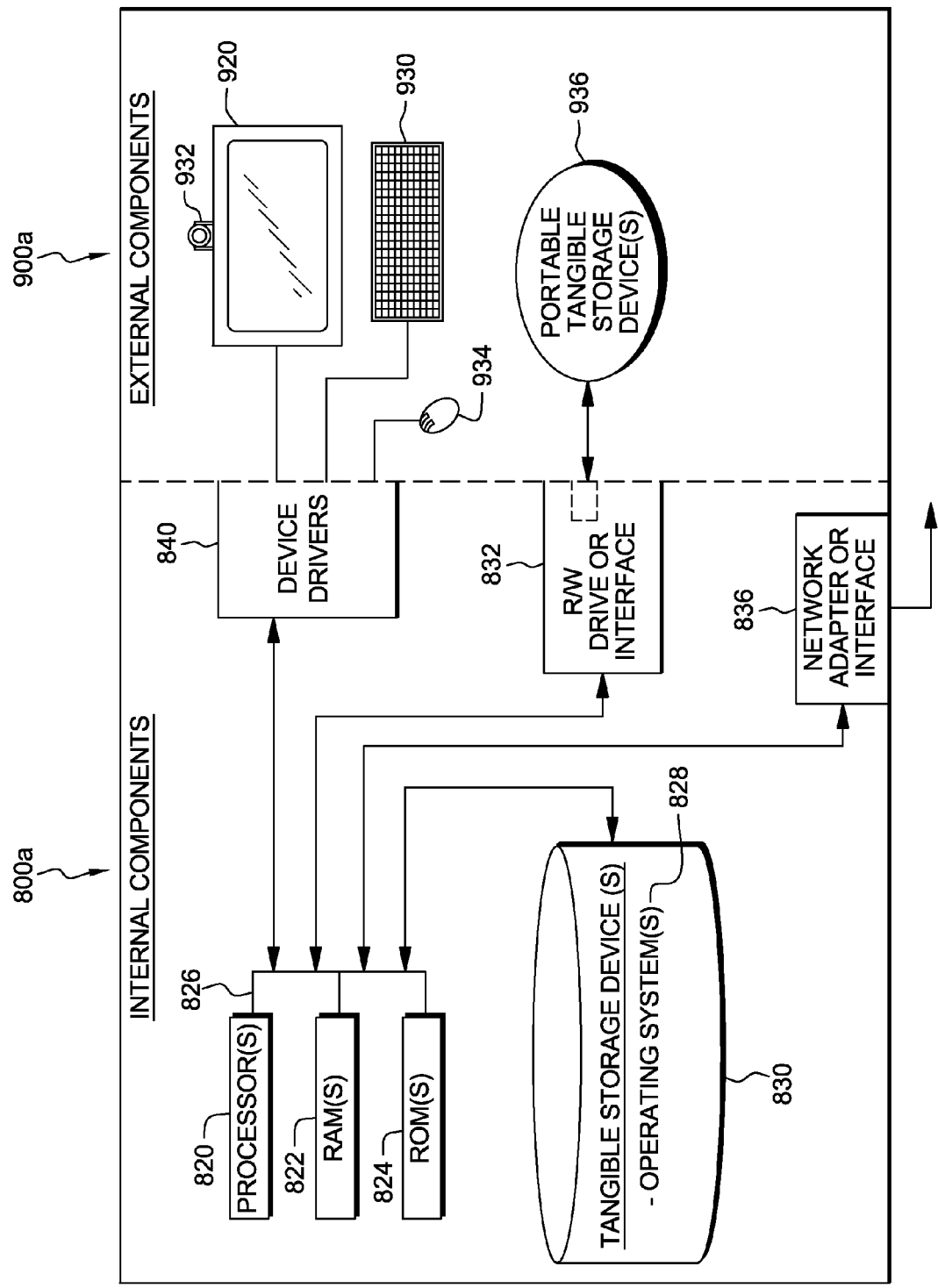
FIG. 8 is a block diagram of internal and external components of a data processing system of a mobile device, such as the mobile computing device of FIG. 1, in accordance with an embodiment of the present invention.

FIG. 8 shows a block diagram of the internal and external components 800a and 900a of a data processing system of a mobile device, such as the mobile computing device 110 of FIG. 1, in accordance with an illustrative embodiment of the present invention. It should be appreciated that FIG. 8 provides only an illustration of one implementation and does not imply any limitations with regard to the environments in which different embodiments may be implemented. Many modifications to the depicted environments may be made based on design and implementation requirements.

The data processing system 800a, 900a is representative of any electronic device capable of executing machine-readable program instructions. Data processing system 800a, 900a may be representative of a smart phone, a computer system, PDA, or other electronic devices. Examples of computing systems that may be represented by data processing system 800a, 900a, include, but are not limited to, personal computer systems, thin clients, thick clients, hand-held or laptop devices, multiprocessor systems, microprocessor-based systems, network PCs, minicomputer systems, and distributed cloud computing environments that include any of the above systems or devices.

Mobile computing device 110 includes a set of internal components 800a, and external components 900a, illustrated in FIG. 8. Each of the sets of internal components 800a, includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, and programs 114 and 116 on mobile computing device 110 are stored on one or more of the respective computer-readable tangible storage devices 830 for execution by one or more of the respective processors 820 via one or more of the respective RAMs 822 (which typically include cache memory). In the illustrated embodiment, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 114 and 116 on mobile computing device 110 can be stored on one or more of the respective portable computer-readable tangible storage devices 936, read via the respective R/W drive or interface 832 and loaded into the respective hard drive 830.

Each set of internal components 800a, can also include network adapters or interfaces 836 such as TCP/IP adapter cards, wireless wi-fi interface cards, 3G or 4G wireless interface cards or other wired or wireless communication links. The programs 114 and 116 on mobile computing device 110 can be downloaded to mobile computing device 110 from an external computer or external storage device via a network (for example, the Internet, a local area network or other, wide area network) and network adapters or interfaces 836. From the network adapters or interfaces 836, the programs 114 and 116 are loaded into the respective hard drive 830. The network may comprise copper wires, optical fibers, wireless transmission, routers, firewalls, switches, gateway computers and/or edge servers.

Each of the sets of external components 900a can include a computer display 920, a keyboard 930, a camera 932, and a computer mouse 934. External components 900a can also include touch screens, virtual keyboards, touch pads, pointing devices, and other human interface devices. Computer display 920 can be an incorporated display screen, such as is used in tablet computers and smart phones. Also, in an alternative embodiment, camera 932 may be an internal component. Each of the sets of internal components 800a also includes device drivers 840 to interface to computer display 920, keyboard 930, camera 932, and computer mouse 934. The device drivers 840, R/W drive or interface 832 and network adapter or interface 836 comprise hardware and software (stored in storage device 830 and/or ROM 824).

FIG. 9 shows a block diagram of the internal and external components 800b and 900b, of a data processing system, such as the mapping server computer 120 of FIG. 1, in accordance with an illustrative embodiment of the present invention. It should be appreciated that FIG. 9 provides only an illustration of one implementation and does not imply any limitations with regard to the environments in which different embodiments may be implemented. Many modifications to the depicted environments may be made based on design and implementation requirements.

The data processing system 800b, 900b is representative of any electronic device capable of executing machine-readable program instructions. Data processing system 800b, 900b may be representative of a smart phone, a computer system, PDA, or other electronic devices. Examples of computing systems that may be represented by data processing system 800b, 900b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Mapping server computer 120 includes a set of internal components 800b and external components 900b, illustrated in FIG. 9. Each of the sets of internal components 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, and program 128 on mapping server computer 120 are stored on one or more of the respective computer-readable tangible storage devices 830 for execution by one or more of the respective processors 820 via one or more of the respective RAMs 822 (which typically include cache memory). In the illustrated embodiment, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. The program 128 on mapping server computer 120 can be stored on one or more of the respective portable computer-readable tangible storage devices 936, read via the respective R/W drive or interface 832 and loaded into the respective hard drive 830.

Each set of internal components 800b can also include network adapters or interfaces 836 such as TCP/IP adapter cards, wireless wi-fi interface cards, 3G or 4G wireless interface cards or other wired or wireless communication links. The program 128 on mapping server computer 120 can be downloaded to mapping server computer 120 from an external computer or external storage device via a network (for example, the Internet, a local area network or other, wide area network) and network adapters or interfaces 836. From the network adapters or interfaces 836, the program 128 is loaded into the respective hard drive 830. The network may comprise copper wires, optical fibers, wireless transmission, routers, firewalls, switches, gateway computers and/or edge servers.

Each of the sets of external components 900b can include a computer display monitor 920, a keyboard 930, and a computer mouse 934. External components 900b can also include touch screens, virtual keyboards, touch pads, pointing devices, and other human interface devices. Alternatively, computer display monitor 920 may be an incorporated display screen, such as is used in tablet computers and smart phones. Each of the sets of internal components 800b also includes device drivers 840 to interface to computer display monitor 920, keyboard 930, and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the present invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus, such that instructions, which execute via the processor of the computer or other programmable data processing apparatus, create means for implementing the functions/acts specified in the flowchart and/or block diagram block or blocks.

The aforementioned programs can be written in any combination of one or more programming languages including low-level, high-level, object-oriented or non object-oriented languages, such as Java®, Smalltalk, C, and C++. The program code may execute entirely on the user's mobile device, partly on the user's mobile device, as a stand-alone software package, partly on the user's mobile device and partly on a server computer, or entirely on a server computer. In the latter scenario, the server computer may be connected to the user's mobile device through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Such modifications and substitutions that may be apparent to a person skilled in the art of the invention are intended to be included within the scope of the invention as defined by the accompanying claims. In this regard, each block in the flowcharts or block diagrams may represent a module, segment, or portion of code, which comprises one or more executable instructions for implementing the specified logical function(s). The foregoing description is not intended to be exhaustive nor to limit the invention to the precise form disclosed. Therefore, the present invention has been disclosed by way of example and not limitation.

What is claimed is:

1. A computer program product to display a map on a mobile computing device and a location of the mobile computing device on the map, the mobile computing device containing a GPS unit, the computer program product comprising:
    one or more computer readable-tangible storage devices and program instructions stored on at least one of the one or more computer readable-tangible storage devices, the program instructions comprising:
    program instructions to scan a paper map external to the mobile computing device to create an actual image of the paper map;
    program instructions to scan (a) a bar code printed on the paper map, the bar code identifying a geographic region encompassed by the paper map, and (b) a mark, printed on the map, indicating a geographic orientation of the paper map;
    program instructions to calculate, based in part on the geographic region encompassed by the paper map and the geographic orientation of the paper map, as determined from the scan, and a current location of the mobile computing device as determined from the GPS unit, a current location of the mobile computing device on the actual image of the paper map; and
    program instructions to display the actual image of the paper map and concurrently display a graphical element superimposed on the displayed map indicating the current location of the mobile computing device on the displayed map.

2. The computer program product of claim 1, wherein the program instructions to calculate the current location of the mobile computing device include the use of trilateration, trigonometry, or Euclidean geometry.

3. The computer program product of claim 1, wherein the program instructions to display the actual image of the paper map include program instructions to display the geographic orientation of the displayed map on the actual image of the paper map.

4. A computer method to display a map on a mobile computing device and a location of the mobile computing device on the map, the mobile computing device containing a GPS unit, the method comprising:

scanning a paper map external to the mobile computing device to create an actual image of the paper map;

scanning (a) a bar code printed on the paper map, the bar code identifying a geographic region encompassed by the paper map, and (b) a mark, printed on the map, indicating a geographic orientation of the paper map;

calculating, based in part on the geographic region encompassed by the paper map and the geographic orientation of the paper map, as determined from the scan, and a current location of the mobile computing device as determined from the GPS unit, a current location of the mobile computing device on the actual image of the paper map; and displaying the actual image of the paper map and concurrently displaying a graphical element superimposed on the displayed map indicating the current location of the mobile computing device on the displayed map.

5. The computer method of claim 4, wherein displaying the actual image of the paper map includes displaying the geographic orientation of the displayed map on the actual image of the paper map.

6. A computer system to display a map on a mobile computing device and a location of the mobile computing device on the map, the mobile computing device containing a GPS unit, the computer system comprising:

one or more computer readable-tangible storage devices and program instructions stored on at least one of the one or more computer readable-tangible storage devices, the program instructions comprising:

program instructions to scan a paper map external to the mobile computing device to create an actual image of the paper map;

program instructions to scan (a) a bar code printed on the paper map, the bar code identifying a geographic region encompassed by the paper map, and (b) a mark, printed on the map, indicating a geographic orientation of the paper map;

program instructions to calculate, based in part on the geographic region encompassed by the paper map and the geographic orientation of the paper map, as determined from the scan, and a current location of the mobile computing device as determined from the GPS unit, a current location of the mobile computing device on the actual image of the paper map; and program instructions to display the actual image of the paper map and concurrently display a graphical element superimposed on the displayed map indicating the current location of the mobile computing device on the displayed map.

7. The computer system of claim 6, wherein the program instructions to display the actual image of the paper map include program instructions to display the geographic orientation of the displayed map on the actual image of the paper map.

\* \* \* \* \*